UNITED STATES PATENT OFFICE.

CYPRIEN MARIE TESSIÉ DU MOTAY, OF PARIS, FRANCE, ASSIGNOR TO EDWARD STERN, OF NEW YORK, N. Y.

IMPROVEMENT IN TRANSFORMING ATMOSPHERIC GASES INTO OXYGEN AND AMMONIA, &c.

Specification forming part of Letters Patent No. 150,007, dated April 21, 1874; application filed November 6, 1873.

*To all whom it may concern:*

Be it known that I, CYPRIEN MARIE TESSIÉ DU MOTAY, of Paris, France, have invented a new and Improved Process of Manufacturing Ammonia and the cyanides of the alkaline bases, of which the following is a specification:

My invention consists, first, in a new and improved process of producing ammonia and cyanogen compounds by the reaction of carbureted hydrogen upon nitride of titanium; second, in a new and improved process of producing the cyanides of the alkaline bases, by the reaction of the salts of said bases upon the cyano-nitride of titanium formed by the action of carbureted-hydrogen gas upon the nitride of titanium; third, in a new and improved process of utilizing the waste subnitrate of titanium, or the titanic acid formed during the reaction of the gas upon the nitride of titanium, as will be hereinafter set forth; and, fourth, in a new and improved process of producing cyanogen compounds from pure hydrogen and the vapor of the light hydrocarbons, as will be fully hereinafter set forth.

In putting my invention into practice, I commence by distilling, in closed retorts, pit-coal, peat, or other similar hydrocarbon, carrying the resultant hydrocarbon gas into a gasometer, where it is collected and retained for use in a subsequent operation. The coke which remains in the retorts I remove, employing part of the same (about fifty per cent. of the entire amount) to distil fresh hydrocarbon for the manufacture of carbureted-hydrogen gas. The remaining portion I use to reduce the oxides of titanium, or titanium ores, first to metallic titanium, and then to the nitride of titanium, to be subsequently used to decompose the carbureted hydrogen formed at the commencement of the operation. The oxides of titanium, or titanium ores, I place with the coke in suitable blast or cupola furnaces, and expose them to an intense heat, the effect of which will be, first, to reduce said ores to the condition of metallic titanium, and then, by reason of the strong affinity which metallic titanium, at a high heat, has for nitrogen, to transform it into nitride of titanium, the titanium taking the nitrogen from the atmospheric air introduced by the blast.

I remove the nitride of titanium, as it is formed, by cutting away the slag which covers it, and withdrawing it in any convenient manner. I then deposit it in layers, in closed retorts, and bring the same to a dull-red heat, and pass into the retorts the carbureted gas previously collected, which decomposes the nitride of titanium, combining with a portion of its nitrogen, forming ammonia and subnitride of titanium. The ammonia thus produced, with any hydrogen that may remain undecomposed and mixed with it, may be drawn off from the retorts and collected, when the ammonia may be separated from the hydrogen by means of water, which will absorb it, and the hydrogen may be returned to the gasometer to be again employed. The subnitrate of titanium remaining in the retorts may be removed, and restored to the condition of nitride of titanium by treating the same in a blast-furnace with coke, in the same manner as the titanium ores are treated, as previously described.

When I desire to produce cyanogen compounds, by the reaction of the gas upon the nitride of titanium, I subject the nitride to the action of the gas, as before mentioned, prolonging the operation until a further reaction takes place between the hydrogen and the ammonia and subnitrate of titanium, which is at first formed, whereby the cyano-nitride of titanium is produced in the retorts, which may afterward be removed. This cyano-nitride of titanium I treat with solutions of potash and soda, which react upon the same, setting free ammonia, which may be collected for use, and forming the cyanides of sodium and potassium and titanic acid. The titanic acid, being insoluble, may be readily separated from the soluble cyanides, and the cyanides may be obtained from their solutions by evaporation. The titanic acid I restore again to the condition of nitride of titanium, in the manner heretofore described for reducing the titanium oxides.

Pure hydrogen, or hydrogen mixed with carbonic oxide, produced by the decomposition of water, may be employed in the production of ammonia by my process; but it will not answer for the production of the cyanogen compounds, as it will not bring about the necessary reaction with the nitride of titanium. It can, however, be made to answer for the manufacture of said compounds by combining with it the vapor of the light hydrocarbons. To effect this, I pass the gas through said light hydrocarbons at a very low temperature—zero, or thereabout—so that the gas will not become overcharged with the vapor, and after this I conduct the process as in the case of the ordinary carbureted-hydrogen gas, which I have fully specified.

I claim—

1. The improved process of producing ammonia and cyanogen compounds by the reaction of carbureted hydrogen upon nitride of titanium, as and for the purposes specified.

2. The process herein described of producing the cyanides of the alkaline bases, by the reaction of the salts of said bases upon the cyano-nitride of titanium, as and for the purposes described.

3. The method of utilizing the waste subnitrate of titanium, or titanic acid formed during the action of the gas upon the nitride of titanium, by reconverting said subnitride into the nitride, substantially as described.

4. The improved process of producing cyanogen compounds, and the cyanides, from pure hydrogen gas, combined with the light hydrocarbon vapors, substantially as specified.

In testimony whereof I have signed my name to this specification before two subscribing witnesses.

C. M. TESSIÉ DU MOTAY.

Witnesses:
J. ARMENGAUD, *Jeune*,
E. STERN.